US011318887B1

(12) United States Patent
Zeng et al.

(10) Patent No.: US 11,318,887 B1
(45) Date of Patent: May 3, 2022

(54) PANORAMIC VIRTUAL ENVIRONMENT FOR IN-VEHICLE ENTERTAINMENT

(71) Applicant: GM GLOBAL TECHNOLOGY OPERATIONS LLC, Detroit, MI (US)

(72) Inventors: Wei Zeng, Oakland Township, MI (US); Jeremie Dernotte, Rochester, MI (US); Ke Liu, Ypsilanti, MI (US); Nicole Ellison, Madison Heights, MI (US); Syed B. Mehdi, Southfield, MI (US); Kevin J. Silang, Sterling Heights, MI (US); Louis G. Hector, Jr., Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/083,495

(22) Filed: Oct. 29, 2020

(51) Int. Cl.
*B60R 1/08* (2006.01)
*H04N 7/18* (2006.01)

(52) U.S. Cl.
CPC ............... *B60R 1/08* (2013.01); *H04N 7/18* (2013.01); *B60R 2300/105* (2013.01); *B60R 2300/303* (2013.01)

(58) Field of Classification Search
CPC ............... B60R 1/08; B60R 2300/105; B60R 2300/303; H04N 7/18
See application file for complete search history.

(56) References Cited

U.S. PATENT DOCUMENTS

| 10,551,623 | B1* | 2/2020 | Tzvieli | B60R 21/214 |
| 10,694,262 | B1* | 6/2020 | Hedman | H04N 21/23424 |
| 2009/0237268 | A1* | 9/2009 | Tomoyuki | B60R 1/00 340/901 |
| 2009/0268093 | A1* | 10/2009 | Ishihara | H04N 7/18 348/564 |
| 2013/0066720 | A1* | 3/2013 | Schwarz | G06Q 30/0224 705/14.53 |
| 2014/0028980 | A1* | 1/2014 | Othmer | G01C 21/365 353/14 |
| 2015/0042751 | A1* | 2/2015 | Leary | G03B 29/00 348/36 |
| 2015/0262435 | A1* | 9/2015 | Delong | G07C 5/085 340/439 |
| 2015/0296140 | A1* | 10/2015 | Kim | H04N 5/23238 348/38 |
| 2018/0089900 | A1* | 3/2018 | Rober | B60Q 9/00 |
| 2019/0045117 | A1* | 2/2019 | Maranville | B60H 1/00021 |

(Continued)

OTHER PUBLICATIONS

Loz Blain, "Futurus wants to turn your car's whole windscreen into an AR display," New Atlas, Published: Dec. 12, 2019, Accessed at URL: https://newatlas.com/automotive/futuris-augmented-reality-windshield-hud/ (Year: 2019).*

(Continued)

*Primary Examiner* — Clifford Hilaire
*Assistant Examiner* — Tyler B Edwards

(57) ABSTRACT

An entertainment system of a vehicle includes: a plurality of cameras configured to capture images around an exterior of the vehicle; one or more displays; and an entertainment module configured to: based on the images, generate panoramic video; and display the panoramic video within the vehicle via the one or more displays.

20 Claims, 10 Drawing Sheets

(56) References Cited

U.S. PATENT DOCUMENTS

2019/0185009 A1* 6/2019 Werner ............. B60W 50/0098
2020/0282832 A1* 9/2020 Watanabe ................ H04N 7/18

OTHER PUBLICATIONS https://www.cnet.com/roadshow/news/toyota-demos-augmented-reality-enhanced-car-windows/; Jul. 21, 2011; 3 pages.
https://www.youtube.com/watch?v=b_sj7Tr9h5I; Published Jan. 18, 2012; 1 page.
Howley, Daniel P. "Meredes Benz's DICS Augmented Reality System: Minority Report for Your Car." https://www.laptopmag.com/articles/mercedes-benzs-dice-augemented-reality-system-minority-report-for-your-car; Jan. 12, 2012; 7 pages.
"See how WayRay laser holographs can turn a windshield into the best AR gear." https://www.cnet.com/roadshow/videos/see-how-wayray-laser-holographs-can-turn-a-windshield-into-the-best-ar-gear/; Jan. 30, 2019; 2 pages.

* cited by examiner

PANORAMIC VIRTUAL ENVIRONMENT FOR IN-VEHICLE ENTERTAINMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to in-vehicle entertainment and more particularly to panoramic in-vehicle entertainment.

Vehicles include one or more torque producing devices, such as an internal combustion engine and/or an electric motor. A passenger of a vehicle rides within a passenger cabin (or passenger compartment) of the vehicle.

Vehicles may include one or more different type of sensors that sense vehicle surroundings. One example of a sensor that senses vehicle surroundings is a camera configured to capture images of the vehicle surroundings. Examples of such cameras include forward facing cameras, rear facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

SUMMARY

In a feature, an entertainment system of a vehicle includes: a plurality of cameras configured to capture images around an exterior of the vehicle; one or more displays; and an entertainment module configured to: based on the images, generate panoramic video; and display the panoramic video within the vehicle via the one or more displays.

In further features, the plurality of cameras include: at least one camera configured to capture images in front of the vehicle; at least one camera configured to capture images to the right of the vehicle; at least one camera configured to capture images to the left of the vehicle; and at least one camera configured to capture images behind the vehicle.

In further features, the entertainment module is configured to perform image stabilization on the images.

In further features, the entertainment module is configured to selectively correct ones of the images for shaking.

In further features, the entertainment module is configured to stitch ones of the images together to create the panoramic video.

In further features, the one or more displays include one or more heads up displays (HUDs) configured to project light onto a windshield of the vehicle and one or more displays configured to display images.

In further features, the one or more displays include at least one of an augmented reality (AR) headset and a virtual reality (VR) headset within the vehicle.

In further features, the entertainment module is configured to perceive an object located outside of the vehicle and animate an item within the panoramic video based on the location.

In further features, the entertainment module is configured to locate the item within the panoramic video based on a location of the object relative to the vehicle.

In further features, the entertainment module is configured to animate the item within the panoramic video based on a type of the object located outside of the vehicle.

In further features, a global positioning system (GPS) module is configured to determine a present location of the vehicle, where the entertainment module is configured to generate the panoramic video further based on the present location of the vehicle.

In further features, the entertainment module is configured to display a visual identifier of an object located in front of the vehicle via at least one of the one or more displays.

In further features, the entertainment module is configured to selectively output audio information regarding the object via one or more speakers of the vehicle.

In further features, the entertainment module is further configured to display a visual advertisement via at least one of the one or more displays.

In further features, the entertainment module is further configured to display a coupon via at least one of the one or more displays.

In further features, the entertainment module is configured to selectively wirelessly transmit the coupon to a computing device of a passenger of the vehicle.

In further features, the entertainment module is configured to selectively execute a game application stored in memory of the vehicle.

In further features, the entertainment module is configured to generate at least one of a visual and an audible prompt for user input indicative of a rating for an entity in response to a determination that the vehicle stopped at the entity.

In a feature, an entertainment method for a vehicle includes: capturing images around an exterior of the vehicle by a plurality of cameras; based on the images, generating panoramic video; and displaying the panoramic video within the vehicle via one or more displays.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
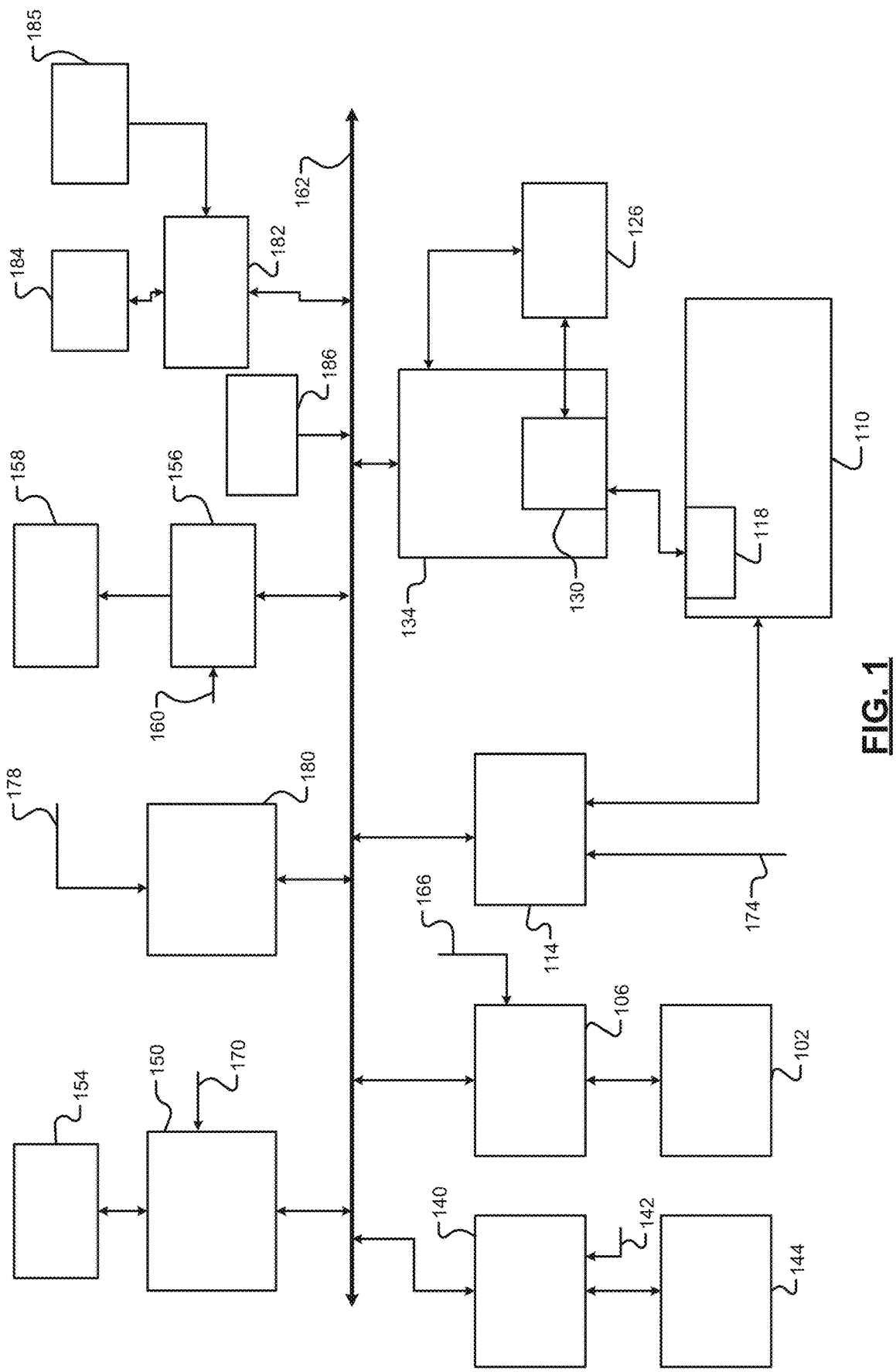
FIG. 1 is a functional block diagram of an example vehicle system.

In the drawings, reference numbers may be reused to identify similar and/or identical elements.

A vehicle may include an infotainment system that allows one or more users to perform infotainment tasks in vehicle via a display (e.g., a touchscreen display) and/or one or more speakers.

The present application involves an entertainment system of a vehicle that provides panoramic and/or 360 degree views within the vehicle. For example, the entertainment system may provide a panoramic view based on vehicle surroundings on one or more displays within the vehicle by stitching together images from in front of the vehicle, beside the vehicle, and behind the vehicle. As another example, the entertainment system may provide a 360 degree virtual environment of a game via a headset (e.g., augmented reality or virtual reality) within the vehicle. The entertainment system may generate objects within the virtual environment of the game based on objects in the real world around the vehicle.

The entertainment system may also provide entertainment features, such as allowing a passenger to play games within the vehicle, outputting (visibly and/or audibly) local information to the passenger, providing advertisements to the user, and providing coupons to the passenger. The above may increase user experience within the vehicle.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. A horn module 156 may apply power to a horn 158 when a horn input 160 is in a first state. The horn 158 outputs sound when power is applied to the horn 158. The horn module 156 may not apply power to the horn 158 when the horn input 160 is in a second state. The horn input 160 may transition from the second state to the first state, for example, in response to user application of at least a predetermined force is applied to a horn input device (e.g., located on the steering wheel). The horn input device may apply a bias force such that the horn input 160 is in the second state when less than the predetermined force is applied to the horn input device.

Modules of the vehicle may share parameters via a controller area network (CAN) 162. The CAN 162 may also be referred to as a car area network. For example, the CAN 162 may include one or more data buses. Various parameters may be made available by a given module to other modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system may also include an entertainment module 182. The entertainment module 182 may be connected to, be a part of, or include an infotainment module of the vehicle.

The entertainment module 182 selectively executes games and outputs gaming feedback via one or more output devices 184. The output devices 184 may include, for example, one or more displays, one or more sets of virtual reality (VR) goggles, one or more sets of augmented reality (AR) goggles, one or more other suitable types of video output devices, one or more speakers, one or more haptic devices, and/or one or more other suitable types of output devices.

The entertainment module 182 outputs gaming video via the one or more displays, one or more sets of VR goggles, and/or one or more sets of AR goggles. The entertainment module 182 outputs gaming audio via the one or more speakers. The entertainment module 182 may also output other gaming feedback via one or more haptic devices. For example, haptic devices may be included with one or more seats, in the steering wheel, in one or more seat belts, etc.

Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays. In various implementations, one or more HUDs may project onto the windshield to use the windshield as a panoramic AR display.

The entertainment module 182 controls play of one or more games based on user input received via one or more input devices 185, such as one or more gaming controllers, one or more joysticks, etc. Under some circumstances, such as when the vehicle is parked, the entertainment module 182 may control gameplay based on input from vehicle components (e.g., the steering wheel, brake and accelerator pedals, horn, etc.).

The entertainment module 182 may additionally or alternatively audibly and/or visibly output other information, such as personalized advertisements, coupons, information about points of interest in front of the vehicle, etc.

The vehicle may include a plurality of external sensors and cameras, generally illustrated in FIG. 1 by 186. One or more actions may be taken based on input from the external sensors and cameras 186. For example, the infotainment module may display video, various views, and/or alerts on a display via input from the external sensors and cameras 186 during driving.

As another example, based on input from the external sensors and cameras 186, a perception module perceives objects around the vehicle and locations of the objects relative to the vehicle. The ECM 106 may adjust torque output of the engine 102 based on input from the perception module. Additionally or alternatively, the PIM 134 may control power flow to and/or from the electric motor 118 based on input from the perception module. Additionally or alternatively, the EBCM 150 may adjust braking based on input from the perception module. Additionally or alternatively, the steering control module 140 may adjust steering based on input from the perception module. The entertainment module 182 may adjust the virtual environment of a game based on objects identified by the perception module, as discussed further below.

The vehicle may include one or more additional control modules that are not shown, such as a chassis control module, a battery pack control module, etc. The vehicle may omit one or more of the control modules shown and discussed.

Figure 2:
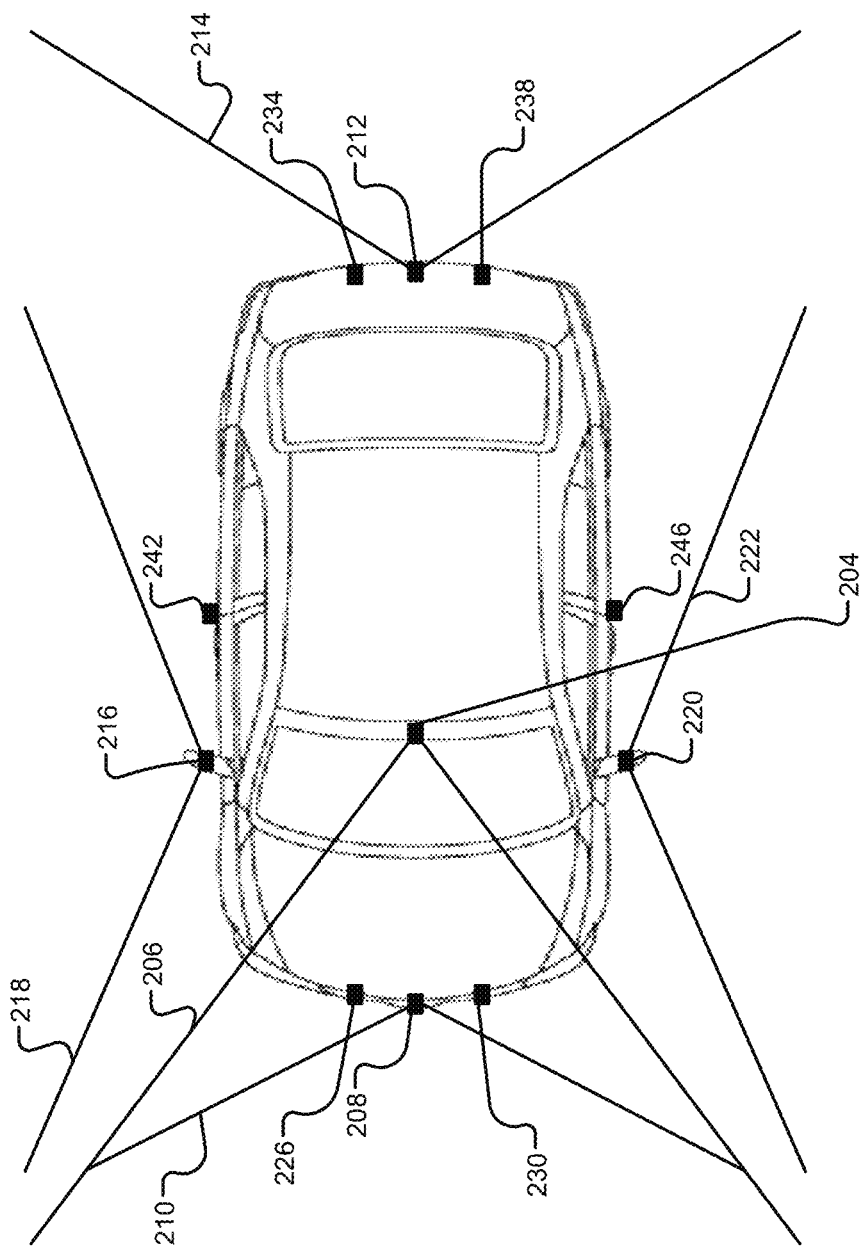
FIG. 2 is a functional block diagram of a vehicle including various external cameras and sensors.

Referring now to FIG. 2, a functional block diagram of a vehicle including examples of external sensors and cameras is presented. The external sensors and cameras 186 include various cameras positioned to capture images and video outside of (external to) the vehicle and various types of sensors measuring parameters outside of (external to the vehicle). For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, however, such as with a rear view mirror at a windshield of the vehicle. The forward facing camera 204 may not be able to capture images and video of items within all of or at least a portion of the predetermined FOV of the front camera 208 and may capture images and video that is greater than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may capture images and video within a predetermined distance behind vehicle and may be located at the rear of the vehicle, such as near a rear license plate.

A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located.

A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 may additionally or alternatively include various other types of sensors, such as ultrasonic sensors, radar sensors, etc. For example, the vehicle may include one or more forward facing ultrasonic sensors, such as forward facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The locations of the cameras and ultrasonic sensors are provided as examples only and different locations could be used. Ultrasonic sensors output ultrasonic signals around the vehicle.

The external sensors and cameras 186 may additionally or alternatively include one or more other types of sensors, such as one or more sonar sensors, one or more radar sensors, and/or one or more light detection and ranging (LIDAR) sensors.

Figure 3:
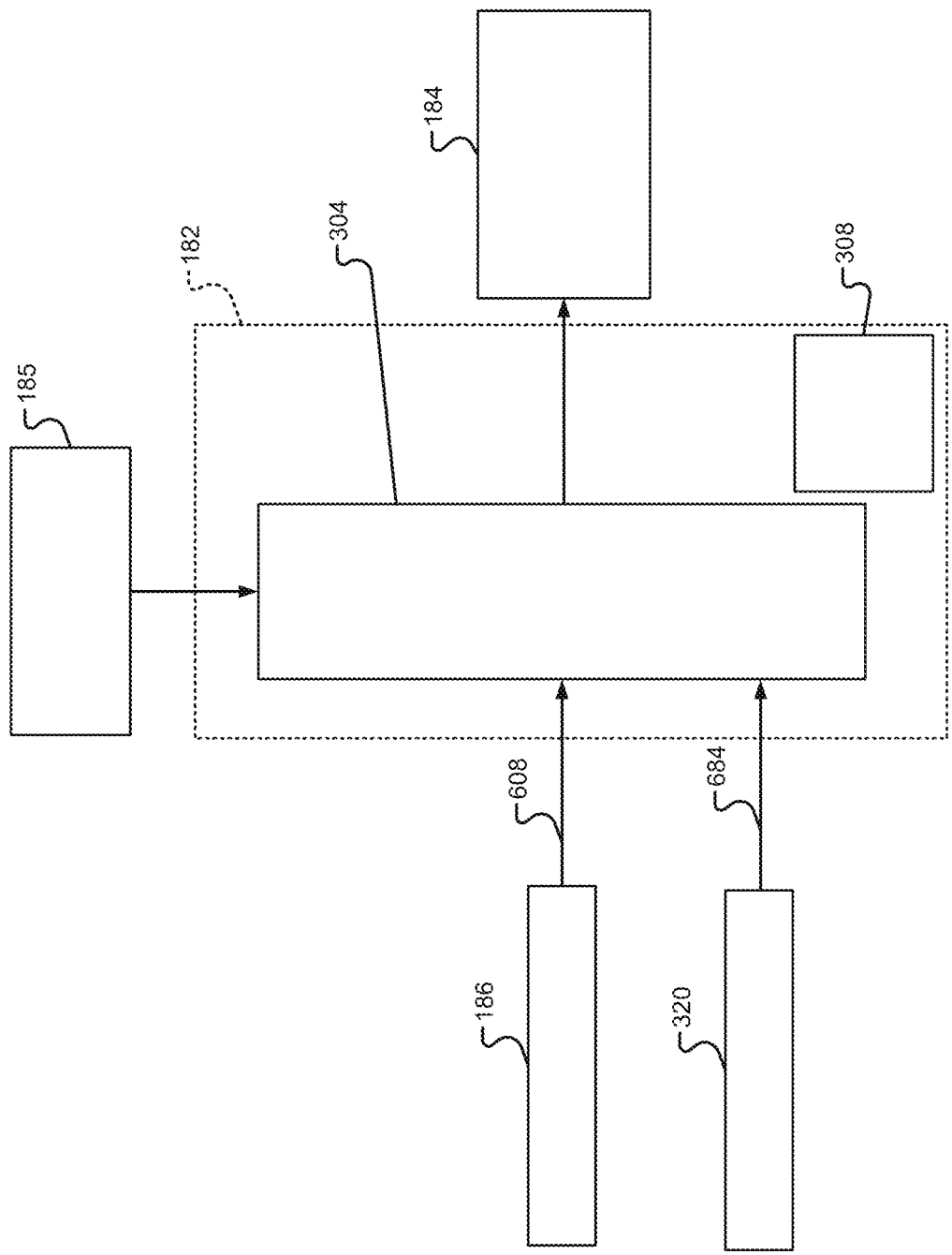
FIG. 3 is a functional block diagram of an example entertainment system of a vehicle.

FIG. 3 is a functional block diagram of an example entertainment system of a vehicle. The entertainment module 182 includes a processor module 304 including one or more processors. The processor module 304 executes one or more applications 308, such as games and other types of applications stored in memory. Each of the games is an application executable by the processor module 304.

During execution of a game, the processor module 304 generates a panoramic virtual environment for the game based on data from the external cameras and sensors 186. In this way, the panoramic virtual environment correlates with the real world surrounding the vehicle. The processor module 304 displays the virtual environment in a panoramic format or 360 degree format via one or more of the output devices 184. For example, the processor module 304 may display the virtual environment of a game in panoramic format via one or more displays that together provide panoramic views in a panoramic format (e.g., having an aspect ratio of at least 3:1 width to height or a greater width). Additionally or alternatively, the processor module 304 may display the virtual environment of a game in panoramic format using one or more HUDs that project panoramic video onto the windshield to use the windshield as a panoramic AR display. Additionally or alternatively, the processor module 304 may display a 360 degree view of the virtual environment using at least one of an AR headset in the vehicle and a VR headset in the vehicle.

Figure 4:
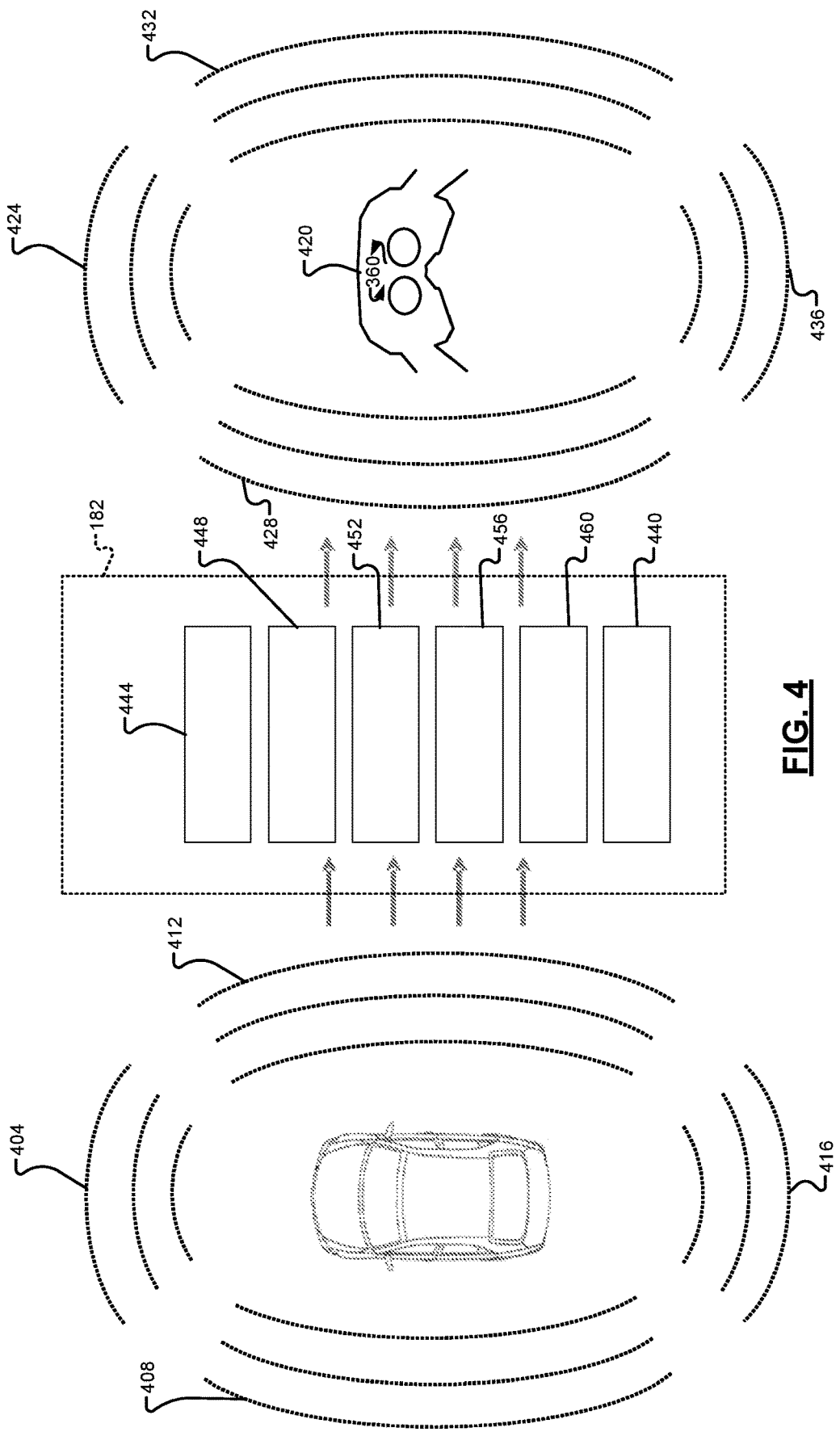
FIGS. 4 and 5 are functional block diagrams of examples of the entertainment system.

FIG. 4 is a functional block diagram for an example of the entertainment system. The entertainment module 182 receives images and data from the external sensors and cameras 186 from in front 404 of the vehicle, left and right sides 408 and 412 of the vehicle, and behind 416 the vehicle. The entertainment module 182 generates 360 degree video based on the received imaged and data and displays the video via one or more AR and/or VR headsets 420. As a user of the headset 420 looks forward (toward the front of the vehicle), the headset 420 displays the virtual environment in a forward direction 424. As a user of the headset 420 looks left (toward the left of the vehicle), the headset 420 displays the virtual environment in a left direction 428. As a user of the headset 420 looks right (toward the right of the vehicle), the headset 420 displays the virtual environment in a right direction 432. As a user of the headset 420 looks backward (toward the back of the vehicle), the headset 420 displays the virtual environment in a backwards direction 436.

Figure 5:
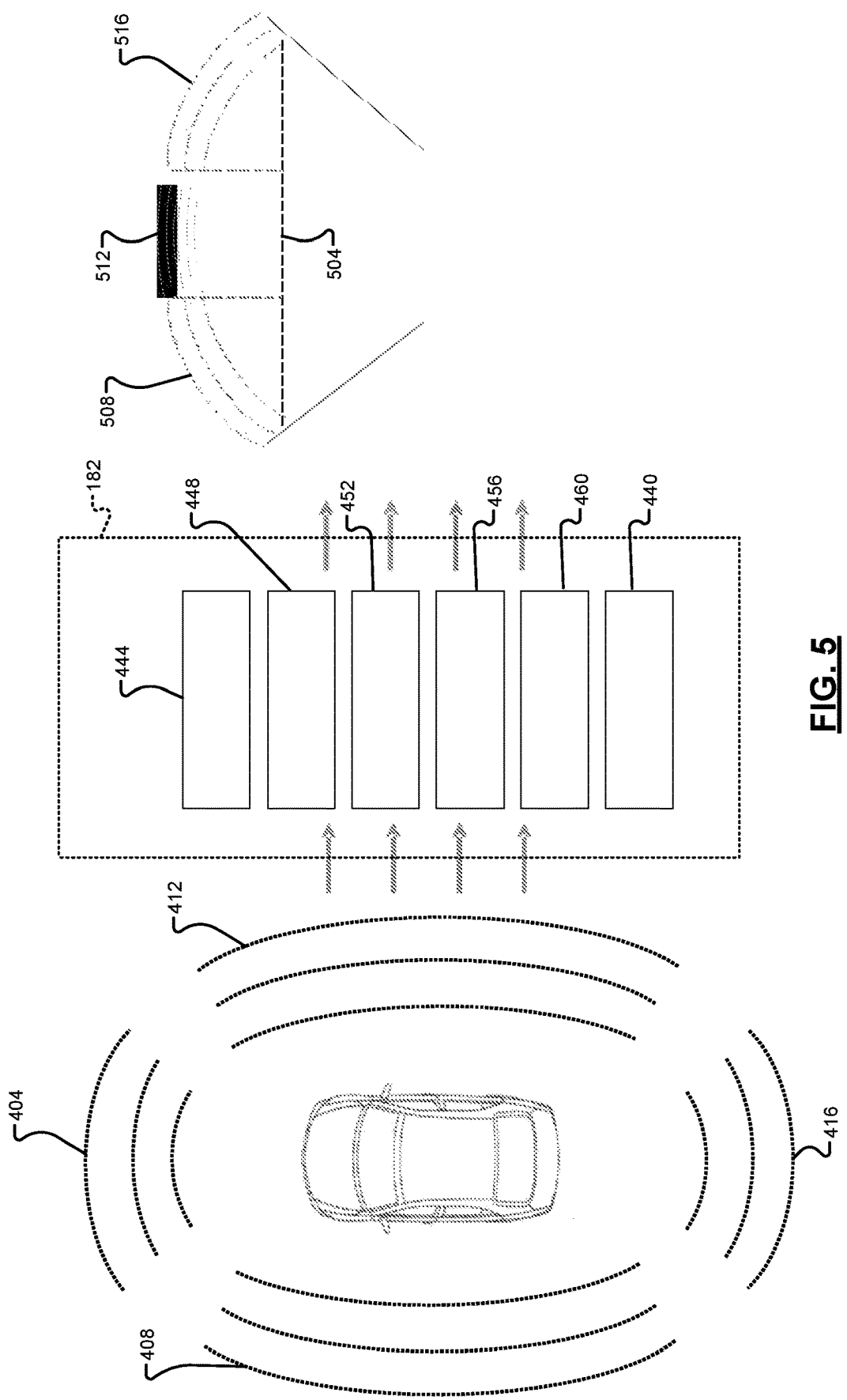

FIG. 5 is a functional block diagram for an example of the entertainment system. In the example of FIG. 5, the entertainment module 182 generates panoramic video 504 (having an aspect ratio of 3:1 width to height or a greater width) based on the received imaged and data and displays the video via one or more display devices. In various implementations, the panoramic video 504 may be displayed using a left display 508, a middle display 512, and a right display 516. In various implementations, the panoramic video 504 may be displayed on the windshield of the vehicle via one or more HUDs.

Referring now to FIGS. 4 and 5, the entertainment module 182 generates the panoramic or 360 degree virtual environment based on a baseline virtual environment 440 for the game. The entertainment module 182 adjusts the baseline virtual environment 440 based on data from the external cameras and sensors 186 to generate the panoramic or 360 degree virtual environment.

The entertainment module 182 performs image stabilizing 444 on images received to, for example, account for vibration of the vehicle. The entertainment module 182 may additionally perform distortion correction 448, for example, to reduce distortion attributable to characteristics (e.g., distortion) of the cameras of the external cameras and sensors 186. The entertainment module 182 stiches 452 the images together for the panoramic or 360 degree virtual environment. For example, the entertainment module 182 stiches the left side of images from in front of the vehicle with the right side of images taken to the left of the vehicle. The entertainment module stiches the right side of images from in front of the vehicle to the left side of images taken to the right of the vehicle.

Based on the data received from the external sensors and cameras 186, the entertainment module 182 perceives 456 objects (e.g., vehicles, buildings, animals, humans, etc.) located in the real world around the vehicle and locations of the objects relative to the vehicle. The entertainment module 182 may create objects in the virtual environment based on the types of objects perceived in the real world and the locations of the objects in the real world using animation 460.

Figure 6:
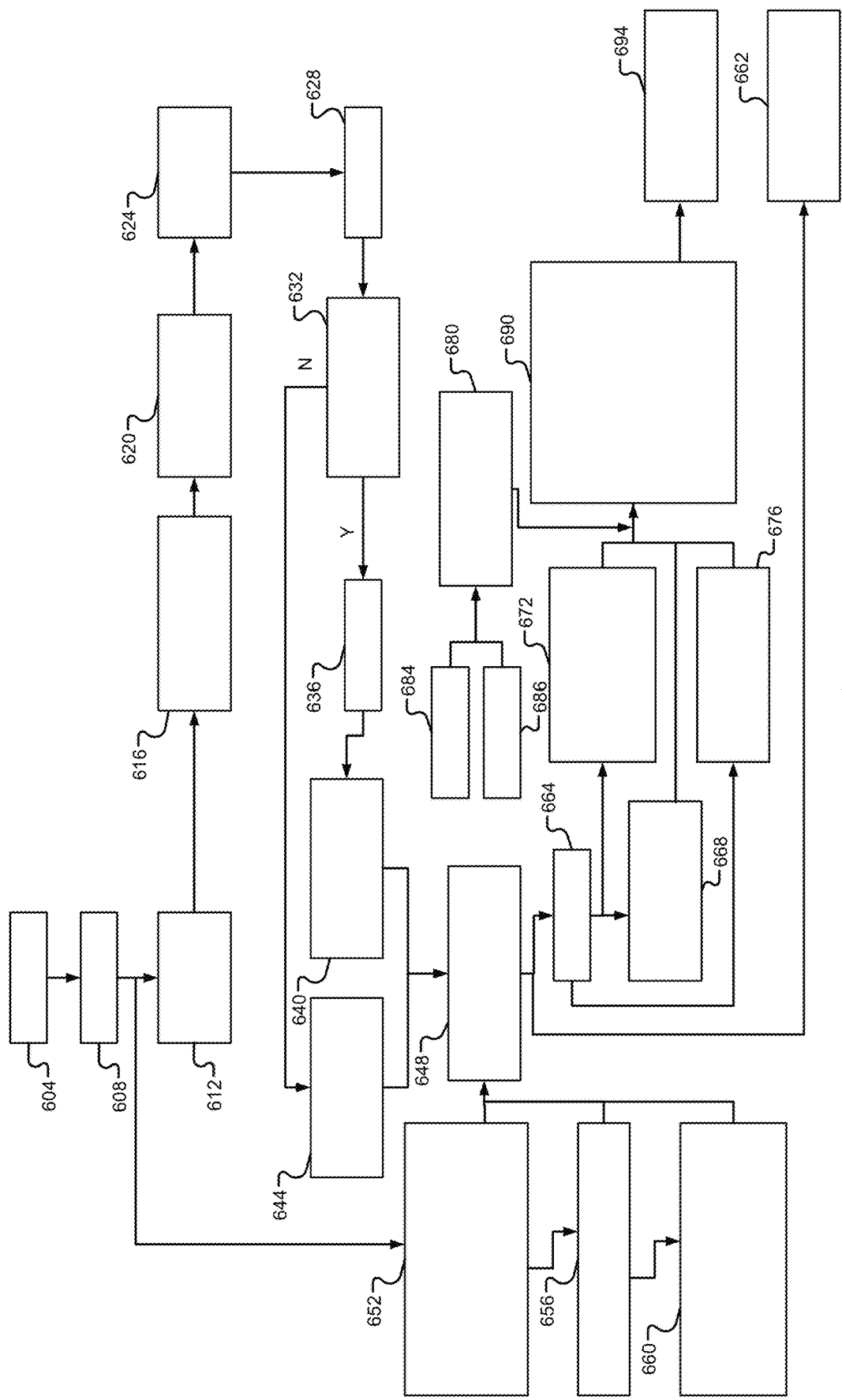
FIGS. 6 and 7 are flowcharts depicting example methods of providing in-vehicle entertainment.

FIG. 6 is a flowchart depicting an example method of providing in-vehicle entertainment. At 608, images from cameras 604 of the external sensors and cameras 186 are obtained. The images include images in front of the vehicle, to the right of the vehicle, to the left of the vehicle, and behind the vehicle.

At 612, the entertainment module 182 corrects the images for any distortion in the images using a distortion correction algorithm. At 616, the entertainment module 182 enters the images into image buffers. The entertainment module 182 may determine whether one or more pixels are outside of a frame border of the images.

At 620, the entertainment module 620 performs pixel movement tracking on the images to track motion of objects in the pixels from image to image. At 624, the entertainment module 182 determines movement trajectory based on the images. At 628, the entertainment module 628 performs extrapolation on the images.

At 632, the entertainment module determines whether a real pixel location of an image is out of trajectory given the movement trajectory (from 624). If 632 is true, control continues with 636 and 640. If 632 is false, control continues with 644. At 644, no image shaking correction is applied to the images, and control continues with 648. At 636, the entertainment module 182 provides smoothing of the images to correct the images for shaking. The smoothing of 636 produces images corrected for shaking at 640, and control continues with 648. Shaking correction may be performed, for example, based on target tracking and trajectory determination.

At 648, the entertainment module 182 stiches the images together to create a panoramic or 360 degree view. The entertainment module 182 may also include features and/or contours at image corners obtained at 652. The entertainment module 182 may also include features and/or contours of interest obtained at 656. The entertainment module 182 may also include information from matching based on points and/or contours of interest at 660. At 652, the entertainment module 182 may obtain features and/or contours near corners of the images using, for example, a scale invariant feature transform (SIFT) algorithm and/or a speeded up robust features (SURF) algorithm. The entertainment module 182 may determine the points and/or contours of interest in the images at 656 using a point of interest identification algorithm and/or a contour of interest algorithm. The entertainment module 182 may perform matching based on points and/or contours of interest at 660 using, for example, an affine transformation algorithm, cross-correlation algorithm, or another suitable type of algorithm.

The panoramic or 360 degree view of the real world around the vehicle can be displayed by the entertainment module 182 at 662 via the one or more displays and/or the one or more headsets (e.g., AR and/or VR headsets). Alternatively, control may continue with 664.

At 664, the entertainment module 182 performs perception at 664. More specifically, the entertainment module 182 perceives objects in the images or the stitched together image. The entertainment module 182 may determine a type of each object and a location of each object relative to the vehicle. Examples of types of objects include, for example, vehicles, pedestrians, cyclists, animals, buildings, etc. The entertainment module 182 may determine the types of the objects using an object detection algorithm. The entertainment module 182 may determine the locations of the objects, for example, based on the FOV of the camera, the location of the object in the pixels of an image, and dimensions (e.g., pixelwise) of the object in the image. As a result of the perception, actors for the game (e.g., vehicles, pedestrians, animals, etc.) are identified at 668. Structures (e.g., buildings, roads, mountains, etc.) are identified at 672. Unrecognizable objects are also identified at 676.

At 680, the entertainment module 182 obtains the virtual environment 440 for the game. For example, the entertainment module 182 may determine a present location for a player of the game in the virtual environment 440 based on a (present) location 684 of the vehicle on a map 686 of the world or a predetermined area around the present location of the vehicle. The location 684 (e.g., latitude, longitude, elevation, heading) of the vehicle may be determined and provided by a global positioning system (GPS) module 320 of the vehicle (FIG. 3). The entertainment module 182 may use the virtual environment as a background at 694.

At 690, the entertainment module 182 animates and locates the perceived objects within the virtual environment 440. The entertainment module 182 may set each different type of object detected to a predetermined type of object in the virtual environment for the game. For example, the entertainment module 182 may animate pedestrians as animals in the virtual environment, vehicles as opponents within the game, and unrecognizable objects as exploratory items within the virtual environment. The entertainment module 182 locates the animated objects within the virtual environment based on the location of the associated objects in the real world relative to the vehicle. The panoramic or 360 degree view of the virtual environment including added objects can be displayed by the entertainment module 182 at 694 via the one or more displays and/or the one or more headsets (e.g., AR and/or VR headsets).

Figure 7:
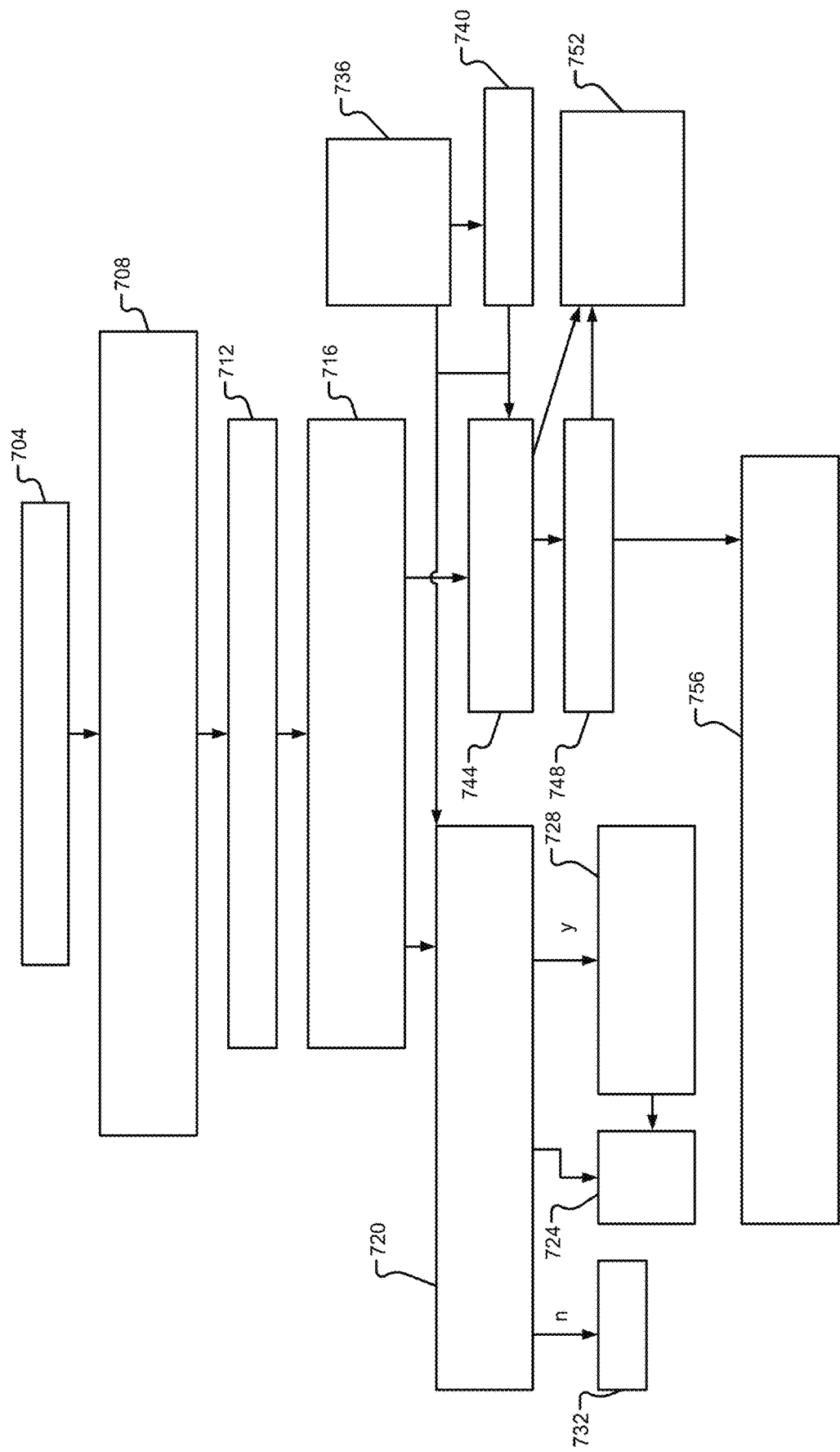

FIG. 7 is a flowchart depicting an example method of providing in-vehicle entertainment. Control begins with 704 where a passenger of the vehicle enters the passenger cabin of the vehicle. At 708, the entertainment module 182 recognizes the passenger. For example, a computing device (e.g., cell phone) may wirelessly connect with the vehicle, such as via an application executing on the computing device. The wireless connection may be, for example, using a Bluetooth transceiver, a WiFi transceiver, or another suitable type of wireless transceiver. The entertainment module 182 may recognize the passenger based on a unique identifier of the computing device. Additionally or alternatively, another type of recognition may be used. For example, the entertainment module 182 may recognize the passenger via biometric recognition, such as facial recognition, fingerprint recognition, speech recognition, etc.

At 712, the entertainment module 182 retrieves user information associated with the passenger. For example, the entertainment module 182 may receive the user information wirelessly from the computing device of the passenger. Alternatively, the entertainment module 182 may obtain the user information from a remote source or locally based on recognizing the passenger.

At 716, the entertainment module 182 obtains the present location of the vehicle, such as from the GPS module 320. The entertainment module 182 may also obtain a heading of the vehicle, such as from the GPS module 320, a compass of the vehicle, and/or one or more images from one or more of the external sensors and cameras 186.

Figure 9:
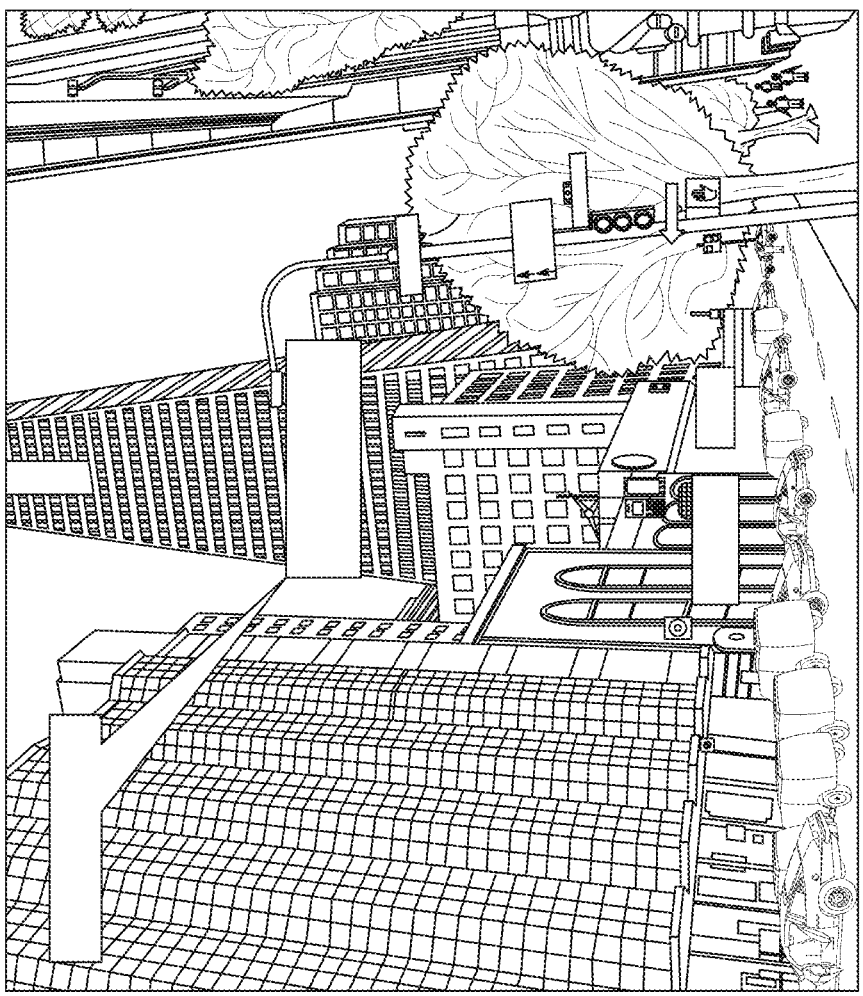
FIG. 9 includes an example illustration of information displayed in association with businesses and points of interest.

At 720, the entertainment module 182 activates an entertainment mode. The entertainment module 182 may activate the entertainment mode automatically (e.g., in response to the recognition of the passenger) or in response to receipt of user input (e.g., via a button, switch, etc.) to activate the entertainment mode. Also at 720, the entertainment module 182 may provide a particular type of entertainment, such as executing a game (e.g., a trivia game) at 724, outputting (e.g., visibly and/or audibly) local information at 728, or no entertainment (no visible or audible output) at 732. The type of entertainment may be selected by the passenger or determined by the entertainment module 182, for example, based on the user information. Local information may be obtained wirelessly from one or more remote sources (e.g., one or more websites, such as Wikipedia, one or more databases, etc.) at 736 and/or from memory 740 of the vehicle. For example, the entertainment module 182 may display local information for businesses that are presently visible in front of the vehicle. The entertainment module 182 may, for example, project information associated with a business or point of interest onto the windshield or into the virtual environment at the location of the business or point of interest. FIG. 9 includes an example illustration of information displayed in association with businesses and points of interest. In addition to a visual display, the entertainment module 182 may audibly output local information regarding businesses and/or points of interest via one or more speakers.

Figure 10:
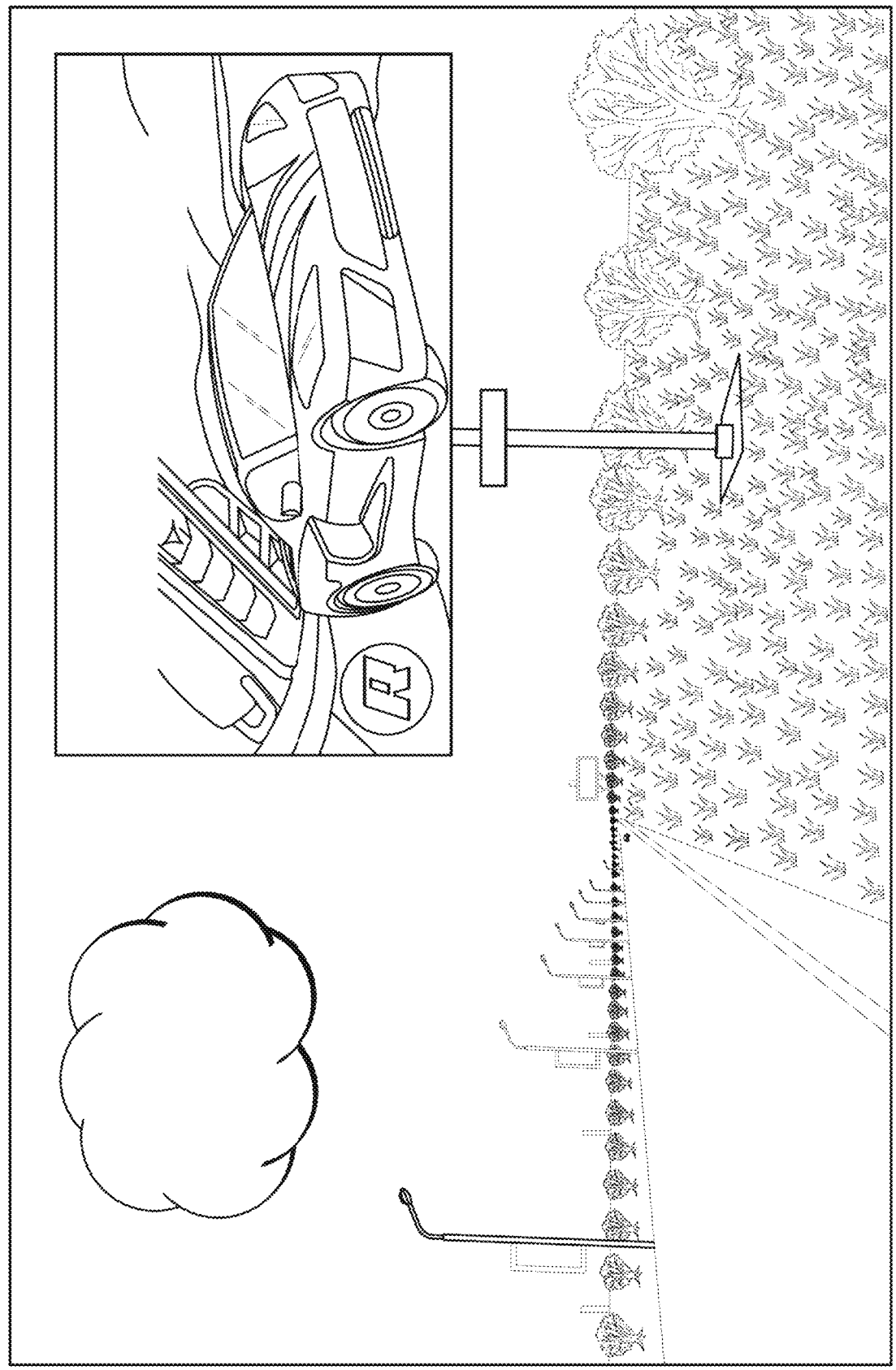
FIG. 10 includes an example illustration of an advertisement and a coupon displayed.

Additionally or alternatively to 720, the entertainment module 182 may display personalized advertisements to the passenger at 744. The entertainment module 182 may determine which advertisements to display based on the user information of the passenger. The entertainment module 182 may determine which advertisements to display further based on the present location of the vehicle. For example, the entertainment module 182 may display advertisements for businesses that are presently visible in front of the vehicle. Additionally or alternatively, the entertainment module 182 may display advertisements in place of billboards that the vehicle is passing. FIG. 10 includes an example illustration of an advertisement displayed in place of a billboard. In addition to a visual display, the entertainment module 182 may audibly output information regarding advertisements via one or more speakers.

The entertainment module 182 may also display one or more coupons at 748 (FIG. 7) with one or more of the advertisements. An example coupon is illustrated in FIG. 10 in association with an advertisement provided in place of a billboard. The advertisements and coupons may be obtained, for example, from one or more remote sources (e.g., one or more websites, such as Wikipedia, one or more databases, etc.) at 736 (FIG. 7) and/or from the memory 740 of the vehicle. The entertainment module 182 may transmit advertisements and/or coupons to the computing device of the passenger from the vehicle at 752.

When the vehicle makes a stop at a location (e.g., a business or a point of interest) for at least a predetermined period (e.g., more than 1 minute), the entertainment module 182 may display a user interface requesting user input regarding a rating of the business or point of interest at the location on one or more displays at 756 (FIG. 7). The location may be a planned stop of the navigation route or identified based on the vehicle being stopped at the location for at least the predetermined period. The user can providing a rating via the user interface. The entertainment module 182 may remove the user interface a predetermined period after the vehicle begins moving away from the location. The entertainment module 182 may determine the business or point of interest at the location from the location, from the navigation route, or in another suitable manner.

Figure 8:
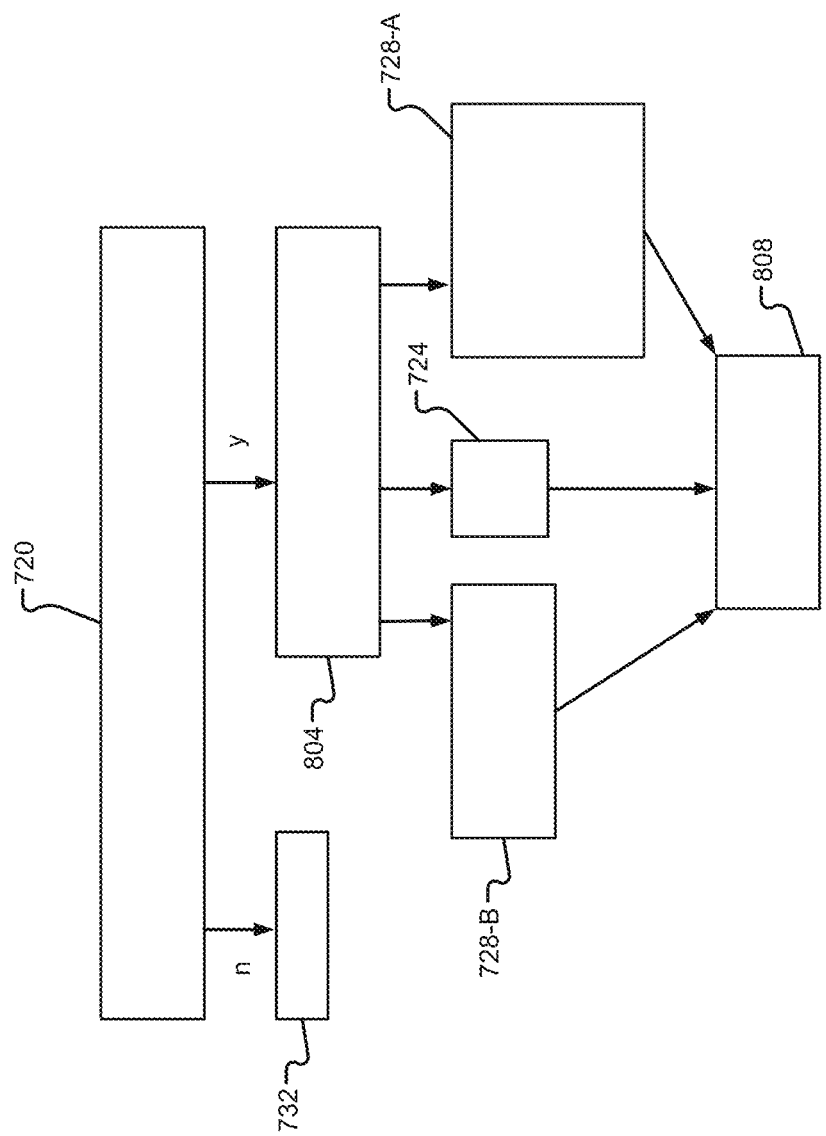
FIG. 8 is a flowchart depicting a portion of the example of FIG. 7.

FIG. 8 is a flowchart depicting a portion of the example of FIG. 7. 720 is discussed above. In response to the passenger activating the entertainment mode, control continues with 804. At 804, the entertainment module 182 may determine whether to provide entertainment interactively (in response to user input), automatically (with or without user input), or to execute a game. For example, in response to user input, the entertainment module 182 may provide entertainment information interactively at 728-B. The entertainment module 182 may, for example, output (audibly or visibly) local information to the user in response to receipt of user input regarding a location (e.g., a business or a point of interest). The entertainment module 182 may provide entertainment information automatically at 728-A. The entertainment module 182 may, for example, output (audibly or visibly) local information to the user based on locations (e.g., businesses or points of interest) located in front of the vehicle. The entertainment module 182 may audibly output information via one or more speakers and display information, for example, via one or more HUDs and/or one or more other displays at 808.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An entertainment system of a vehicle, comprising:
    a plurality of cameras configured to capture images around an exterior of the vehicle;
    one or more displays; and
    an entertainment module configured to:
        based on the images, generate panoramic video including a virtual environment of a game;
        display the panoramic video within the vehicle via the one or more displays; and
        at least one of:
            perceive a pedestrian located outside of the vehicle and animate the pedestrian as an animal within the panoramic video; and
            perceive a second vehicle located outside of the vehicle and animate the second vehicle as an opponent within the panoramic video.

2. The entertainment system of claim 1 wherein the plurality of cameras include:
    at least one camera configured to capture images in front of the vehicle;
    at least one camera configured to capture images to the right of the vehicle;
    at least one camera configured to capture images to the left of the vehicle; and
    at least one camera configured to capture images behind the vehicle.

3. The entertainment system of claim 1 wherein the entertainment module is configured to perform image stabilization on the images.

4. The entertainment system of claim 1 wherein the entertainment module is configured to selectively correct ones of the images for shaking.

5. The entertainment system of claim 1 wherein the entertainment module is configured to stitch ones of the images together to create the panoramic video.

6. The entertainment system of claim 1 wherein the one or more displays include one or more heads up displays (HUDs) configured to project light onto a windshield of the vehicle and one or more displays configured to display images.

7. The entertainment system of claim 1 wherein the one or more displays include at least one of an augmented reality (AR) headset and a virtual reality (VR) headset within the vehicle.

8. The entertainment system of claim 1 wherein the entertainment module is configured to perceive an object located outside of the vehicle and animate an item within the panoramic video based on the location.

9. The entertainment system of claim 8 wherein the entertainment module is configured to locate the item within the panoramic video based on a location of the object relative to the vehicle.

10. The entertainment system of claim 8 wherein the entertainment module is configured to animate the item within the panoramic video based on a type of the object located outside of the vehicle.

11. The entertainment system of claim 1 further comprising a global positioning system (GPS) module configured to determine a present location of the vehicle,
    wherein the entertainment module is configured to generate the panoramic video further based on the present location of the vehicle.

12. The entertainment system of claim 1 wherein the entertainment module is configured to display a visual identifier of an object located in front of the vehicle via at least one of the one or more displays.

13. The entertainment system of claim 12 wherein the entertainment module is configured to selectively output audio information regarding the object via one or more speakers of the vehicle.

14. The entertainment system of claim 1 wherein the entertainment module is further configured to display a visual advertisement via at least one of the one or more displays.

15. The entertainment system of claim 14 wherein the entertainment module is further configured to display a coupon via at least one of the one or more displays.

16. The entertainment system of claim 1 wherein the entertainment module is further configured to display a coupon via at least one of the one or more displays.

17. The entertainment system of claim 16 wherein the entertainment module is configured to selectively wirelessly transmit the coupon to a computing device of a passenger of the vehicle.

18. The entertainment system of claim 1 wherein the entertainment module is configured to selectively execute a game application stored in memory of the vehicle.

19. The entertainment system of claim 1 wherein the entertainment module is configured to generate at least one of a visual and an audible prompt for user input indicative of a rating for an entity in response to a determination that the vehicle stopped at the entity.

20. An entertainment method for a vehicle, comprising:
    capturing images around an exterior of the vehicle by a plurality of cameras;
    based on the images, generating panoramic video including a virtual environment of a game; and
    displaying the panoramic video within the vehicle via one or more displays,
    wherein the generating the panoramic video includes at least one of:
        perceiving a pedestrian located outside of the vehicle and animating the pedestrian as an animal within the panoramic video; and perceiving a second vehicle located outside of the vehicle and animating the second vehicle as an opponent within the panoramic video.

* * * * *